United States Patent [19]

Lazzaretti

[11] 4,255,863
[45] Mar. 17, 1981

[54] CONTINUOUS CASTING MOLD TAPER GAGE

[75] Inventor: Louis Lazzaretti, Badden, Pa.

[73] Assignee: Gladwin Corporation, Taylor, Mich.

[21] Appl. No.: 140,177

[22] Filed: Apr. 14, 1980

[51] Int. Cl.³ .............................................. G01B 3/56
[52] U.S. Cl. ................................. 33/174 E; 33/172 R
[58] Field of Search ............ 33/174 E, 174 G, 172 R, 33/172 B, 149 R, 376

[56] References Cited

U.S. PATENT DOCUMENTS

| | | | |
|---|---|---|---|
| 1,670,432 | 5/1928 | Baldon | 33/376 |
| 1,882,993 | 10/1932 | Schwarze | 33/174 E |
| 2,383,243 | 8/1945 | Ebinger et al. | 33/174 E |
| 2,920,392 | 1/1960 | Stromquist | 33/174 E |
| 3,286,356 | 11/1966 | Johnson | 33/376 |

FOREIGN PATENT DOCUMENTS 590329  1/1934  Fed. Rep. of Germany ........ 33/174 E

Primary Examiner—Willis Little
Attorney, Agent, or Firm—Cullen, Sloman, Cantor, Grauer, Scott & Rutherford

[57] ABSTRACT

A gage, for determining the taper angle of the inner faces of the end walls of a continuous casting mold, includes a pair of rigidly connected, spaced apart, elongated, wall contact strips having parallel straight edges for engaging the wall for substantially its full height. A center, measuring strip is arranged between the wall contact strips and is pivotally connected to them at their lower ends. The measuring strip is pivoted by a manually operable screw that connects its upper end to the upper end of a wall contact strip. A level indicator mounted upon the top of the measuring strip indicates when that strip is vertical. A distance indicator gage mounted on the strips measures the amount of pivotal movement of the measuring strip until it becomes vertical. The taper gage is suspended in a mold and the wall contact strip straight edges are pressed against a mold end wall. Then the operator manipulates the screw to pivot the measuring strip until the level indicates that it is vertical. At that point, he reads the distance measuring indicator which may be calibrated to directly read the wall taper.

10 Claims, 9 Drawing Figures

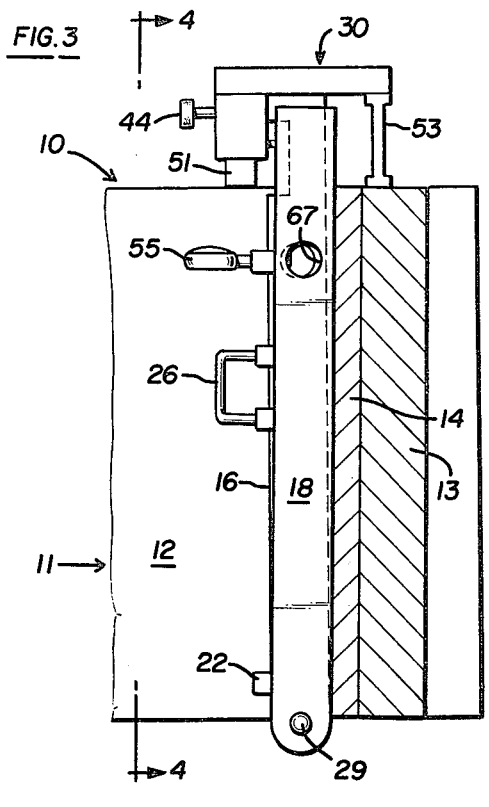
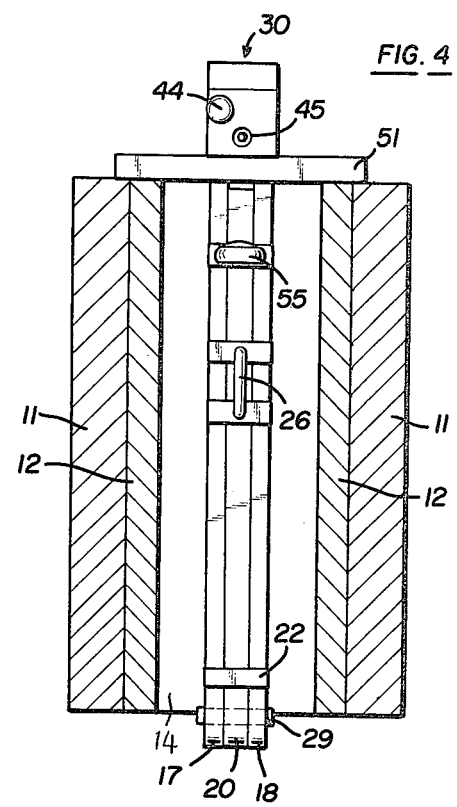
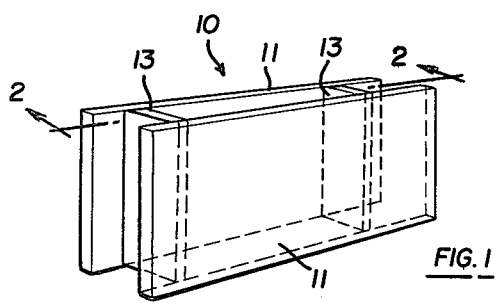
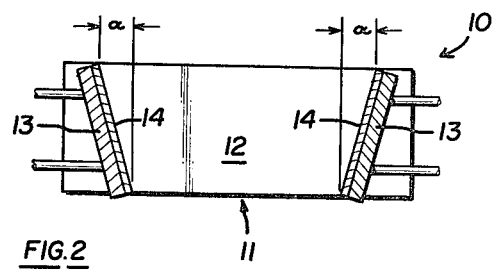
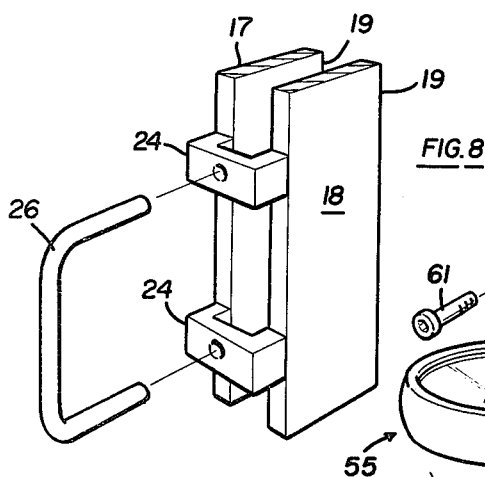
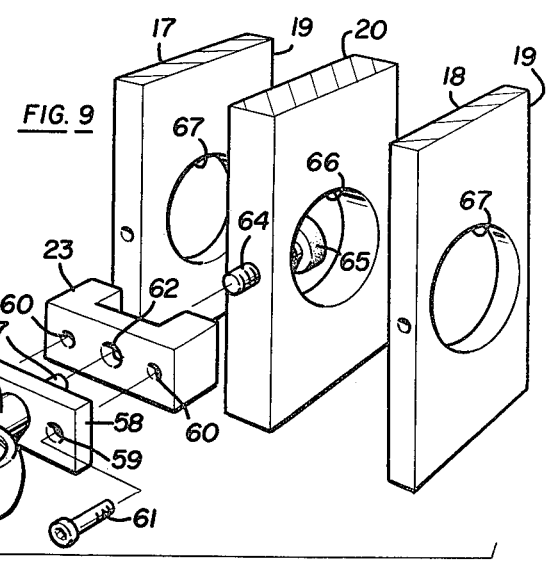

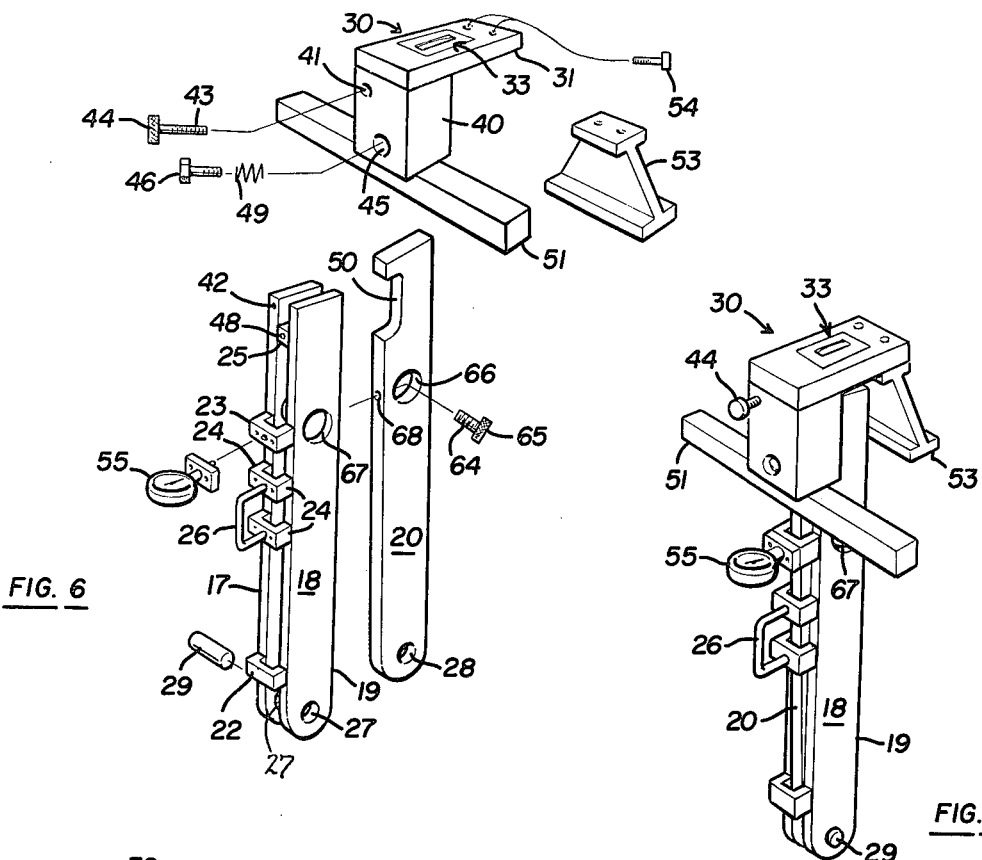
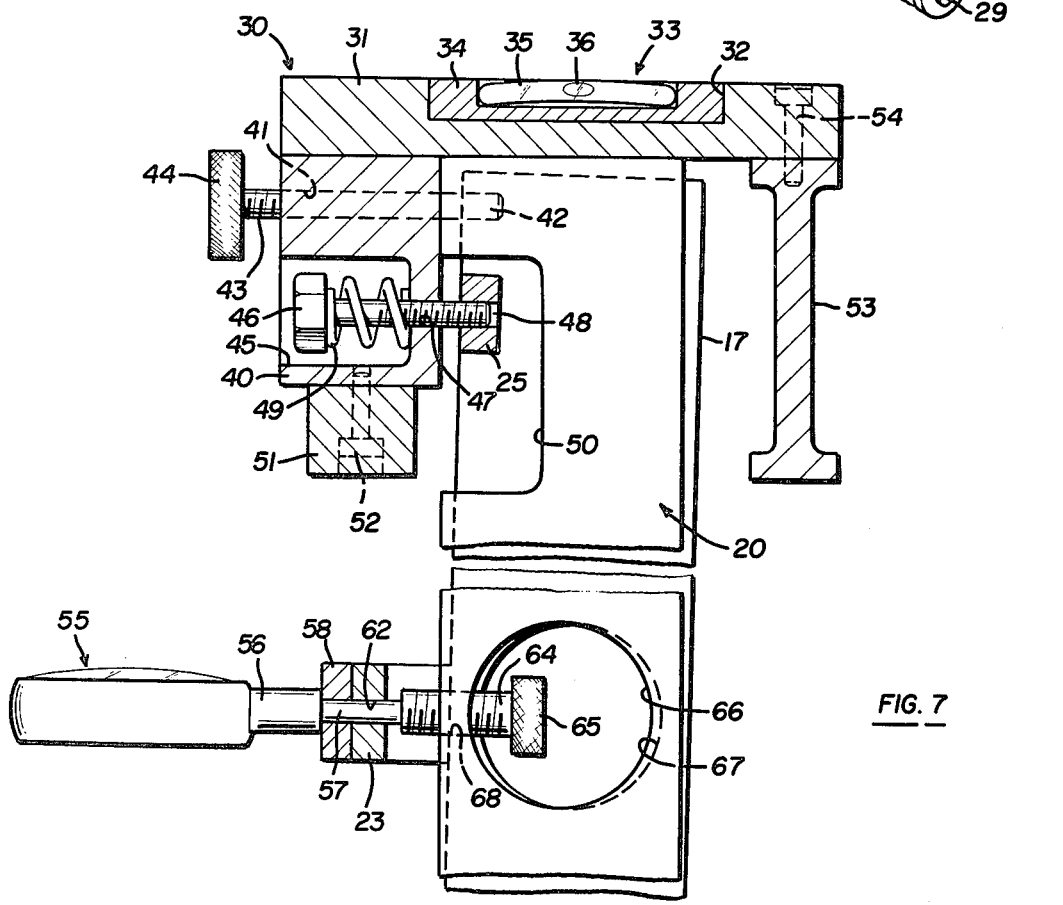

CONTINUOUS CASTING MOLD TAPER GAGE

BACKGROUND OF INVENTION

The invention herein relates to a measuring device for manually determining the slope or taper angle of the end wall faces of a continuous casting mold. An example of such a type mold is illustrated and described in U.S. Pat. No. 3,964,727 issued Jan. 22, 1976 to Floyd R. Gladwin. Another example of such type mold and the operation of the continuous casting process with which such mold is used, is illustrated and disclosed in U.S. Pat. No. 4,023,612 issued May 17, 1977 to Charles Richard Jackson.

In general, the continuous casting process involves pouring molten steel into the open upper end of a bottom-less, box-like casting mold. The mold walls are cooled so that the molten metal begins to solidify while in the mold.

As the metal cools within the mold, a surface skin is formed where the metal contacts the cooled mold walls. That skin surrounds an interior molten core. Thus, the cast strand comprising a solidified skin enclosing a molten core, gravity feeds downwardly through the open bottom of the mold. The downwardly emerging strand is supported by rollers or roller aprons which prevent the skin from bursting due to the ferrostatic pressure within the core. Meanwhile, water sprays are applied to the strand to continue the cooling. Ultimately, the strand is solidified throughout and then lengths of the strand are cut off to form predetermined sized slabs.

The continuous strand or cast slab, while varying considerably in size, may be roughly on the order of four to twelve inches in thickness and two to five feet in width. The continuous strand is cut to desired length pieces.

The mold typically is formed of a pair of spaced apart broad or wide mold walls. Between the wide walls are an opposing pair of narrow, end walls. The walls are formed of a heavy fabricated steel wall construction with inner facings or linings made, usually, of copper. Cooling channels arranged between the interfaces between the copper linings and the steel walls, carry cooling water for removing heat from the molten cast material which contacts the copper lining inner faces.

Because the molten metal shrinks as it cools, the end walls usually are tapered or sloped from top to bottom, so that they are closer together at the lower end of the mold than at the upper end of the mold.

Various mechanical mounting means are used to position and to secure the end walls between the broad walls and to permit the end walls to be angled slightly to provide the desired slope. Thus, it is necessary to measure the slope or tilt of the end walls.

Because of the nature, size and location of the mold within the continuous casting apparatus, it is relatively difficult and time consuming to determine the slope or taper angle of the end walls. Hence, the invention herein is concerned with a measuring device which can be utilized manually to rapidly determine the slope.

SUMMARY OF INVENTION

The invention herein contemplates a measuring device which can be located against the sloping or tapered inner wall face of an end wall of a continuous casting mold to give an optically read slope or angle determination. The invention contemplates using an elongated flat strip having a straight edge which can be manually pushed against the mold face. A second elongated strip, which is pivotally connected to the first strip, is moved into a vertical portion, by means of an adjustment screw. A level indicator mounted upon the upper end of the second strip gives the operator a visual reading of the point where the strip is vertical. Then, a conventional distance indicator, which is used for measuring small distances, and which is mounted upon the two strips, gives an optical readout of the distance moved by the strip into the vertical relative to the strip pressed against the mold wall. That readout can be calibrated in relative distance between the upper and lower edges of the sloped face, such as a number of thousandths of an inch, or alternatively as an angle of slope. Thus, the device may be operated by a single individual using both his hands and optically reading the indicators to make the slope determination.

One object of this invention is to provide a device which can be applied to substantially the entire height of the mold surface so as to get an accurate reading of slope or taper even in the event of slight surface discrepancies of the mold face liner.

Another object of this invention is to provide a simplified, manually operable device which can be rapidly operated by a single person, and which will provide highly accurate slope measurements, that is, accuracies within a few thousandths of an inch of less, despite the height of the mold wall being on the order of several feet.

The device contemplated by this invention is simply constructed, with a minimal number of moveable parts and with a simplicity of operation which makes it possible for a single person to rapidly manipulate it, with both hands, to get a quick reading despite the awkward location of the area at which the reading is to be taken.

These and other objects and advantages of this invention will become apparent upon reading the following description, of which the attached drawings form a part.

DESCRIPTION OF DRAWINGS

FIG. 1 is a perspective, schematic view of a typical continuous casting mold.

FIG. 2 is a schematic, cross-sectional, elevational view of the mold, taken in the direction of arrows 2—2 of FIG. 1.

FIG. 3 is an enlarged, cross-sectional view of an end wall of the mold with the measuring device positioned within the mold.

FIG. 4 is a cross-sectional view taken through the broad walls of the mold and showing an end view of the measuring device positioned against the end wall, with the view taken in the direction of arrows 4—4 of FIG. 3.

FIG. 5 is a perspective view of the taper gage.

FIG. 6 is a perspective view of the gage parts, shown disassembled.

FIG. 7 is an enlarged, cross-sectional, fragmentary view showing the upper and middle portions of the gage.

FIG. 8 is a perspective, fragmentary view, of the handle portion of the wall contact strips.

FIG. 9 is a perspective, disassembled view, showing the distance indicator assembly relative to the strips.

DETAILED DESCRIPTION

FIG. 1 schematically illustrates a typical continuous casting mold 10. The mold is formed of broad or side walls 11 having copper liners 12 on their interior faces. Between the broad walls are positioned the narrow end walls 13 which are also covered with interior copper liners 14. The interface between the copper liners and the mold walls are provided with cooling channels through which cooling water is circulated to remove the heat of the molten metal. However, these are not illustrated in the drawings as they are not pertinent to the invention herein.

The end walls 13 have mounting and positioning support rods which hold them between the broad walls. Then the broad walls clamp against the end walls.

FIG. 2 illustrates schematically the slope or taper of the end wall inner copper faces, with the angle of slope being designated by the letter "a". The actual slope or taper is very slight, as for example, a 16th of an inch horizontal offset difference between the upper end of the mold face and the lower end. The slope may be measured in thousandths of an inch horizontal offset of the upper end of the mold, wall face from the vertical plane, passing through to the lower edge of the mold wall face.

The taper gage, as shown in FIGS. 5 and 6, includes a pair of elongated, flat, narrow, wall contact strips 17 and 18 having straight edges 19 for positioning upon the inner copper face of the end wall of the mold. A measuring or pivot or center strip 20 is positioned between the two wall contact strips 17 and 18.

Preferably, the strips are made of lightweight material, such as magnesium, and may be provided with a series of holes along their lengths in order to lighten them still further. These holes are not illustrated.

The two wall contact strips are rigidly fastened together by means of a lower U-shaped connector 22, an upper U-shaped connector 23, a pair of U-shaped handle connectors 24 and an upper block 25, all welded to the respective strips. A U-shaped manually grasping handle 26 is welded to the connectors 24 (see FIG. 8).

In order to fasten the pair of wall contact strips to the pivot or measuring strip, aligned holes 27 are formed in the lower ends of the wall contact strips and a corresponding hole 28 is formed in the pivot strip 20. A pivot pin 29 extends through the holes so that the center or measuring or pivot strip 20 may swing around the pin away from the straight edges 19 of the wall contact strips 17 and 18. The U-shaped connectors provide clearance for the center strip to pivot rearwardly relative to the contact strip straight edges.

The measuring strip is provided with a vertical indicator 30. This comprises a horizontal block 31 having an upper socket 32 containing a bubble level 33. The bubble level, which is conventional, is made of a level body 34 containing a liquid containing level tube 35 and a bubble 36 which centers in the tube when the tube is horizontal.

An adjustment block 40 is secured, as by welding, to the bottom of the horizontal block 31 as well as the the upper end of the center or pivot strip 20. A threaded hole 41 extends through the adjustment block in alignment with a threaded hole 42 formed in wall contact strip 17. An adjustment screw 43 extends through the holes 41 and 42 so that upon manual grasping of its knurled head 44, the screw may be turned and thereby move the center or pivot strip 20 relative to the pair of wall contact strips 17 and 18.

An enlarged, horizontally extending bore 45 in the adjustment block receives a bolt 46 which extends through a hole 47 into a threaded hole 48 in upper block 25. A compression spring 49 surrounding the bolt provides a resilient resistance to the pivoting of the center strip rearwardly away from the straight edges and, conversely, tends to resistantly return the center strip into alignment with the pair of wall contact strips 17 and 18. The center strip is provided with a relief cut-out 50 so as to accommodate the block 25 (see FIG. 7).

An elongated, horizontally arranged, squaring bar 51 is fastened by a screw 52 to the bottom of the adjustment block 40. This squaring bar is of sufficient length to extend across and rest upon the upper ends of the two broad walls of the mold, as shown in FIG. 4. In addition, a balance bar 53 in the form of an enlarged I-beam is fastened by screws 54 to the opposite end of the horizontal block 31 to balance it and make it easier to support upon the mold prior to the use of the gage.

A conventional, commercially available, direct readout distance indicator gage 55 is secured to the pair of wall contact strips 17 and 18 for measuring the movement of the measuring or pivot strip 20. The indicator has a base cylinder 56 through which the indicator stem 57 extends. A support bar 58 is fastened to the base cylinder and the indicator stem extends through the support bar.

Holes 59, in the support bar, are aligned with holes 60 in the upper U-shaped connector 23. Screws 61 passing through these aligned holes fasten the indicator gage upon the pair of strips 17 and 18 (see FIG. 9).

The indicator stem 57 extends through a hole 62 formed in the U-shaped connector 23. The end of the stem contacts an adjustable anvil in the form of the end of the shank 64 of a screw having a head 65. The screw head is located within a hole 66 located in the center strip and aligned holes 67 formed in the mold contact strips. Consequently, the anvil screw can be turned manually to a desired initial setting as it is threaded within a hole 68 formed in the center strip.

Movement of the measuring or center strip relative to the pair of mold contact strips causes the indicator stem to move, which in turn operates the indicator needle 70 of the indicator 55. The indicator 55 may be made of any conventional direct readout type of indicator, either mechanical or electronic to give a readout either in distance moved, or converted into angle of slope or such other form of slope indication as may be desired.

OPERATION

Because the gage is of relatively light weight, even though it is long enough to extend the full height of the mold, it may be easily handled by one hand holding the handle. For example, forming the parts out of magnesium, with the strips being on the order of roughly ⅜ of an inch thick and roughly 2¾ inches wide with a length of roughly 38 inches, the entire unit may weigh approximately 15 pounds, more or less. In any event, it is light enough to manipulate with one hand, particularly since the handle is located about in the middle so that it is well balanced for one hand operation.

The workman operating the gage climbs up to the upper end of the mold, during the time that the continuous casting is inoperative, and grasping the handle positions the gage within the mold, with the gage squaring bar 51 resting upon the upper ends of the broad walls.

By pushing the handle, the straight edges 19 are arranged in complete surface to surface engagement with substantially the full height of the sloping inner face of the copper liner of the end wall.

Next, while still holding the handle to tightly press the wall contact strips into engagement with the liner, the workman uses his other hand to turn the adjustment screw 44 to cause the center or measuring strip to pivot away from the mold wall, against the resistance of the spring 49.

When the level bubble 36 indicates that the indicator level 30 is horizontal, thereby positioning the measuring strip vertically, the adjustment screw is stopped. At that point, the operator reads the indicator gage 55 which gives him a direct readout of the distance moved by the strip relative to the pair of wall contact strips or alternatively, depending upon the calibration of the gage, gives him the angle of slope or the distance of the upper end of the mold wall from the vertical plane containing the bottom end of the mold wall.

As can be seen, the operation is simple and rapid and involves no particular skill. Nevertheless, a very accurate reading can be obtained and readings can be taken at several places along the wall, if desired, with minimal time.

Having fully described an operative embodiment of this invention, I now claim:

1. A continuous casting mold wall taper gage for determining the angle, relative to vertical, of the interior casting face of a mold wall, comprising:

a vertically elongated, wall contact strip having one of its vertical edges formed as a straight edge for engaging the inner face of a mold wall;

a vertically elongated measuring strip arranged parallel and adjacent to the wall contact strip said measuring strip having one of its vertical edges formed as a straight edge for engaging the inner face of said mold wall;

a vertical position indicator gage mounted upon the upper end of the measuring strip for indicating when the measuring strip is vertically upright;

a horizontally axised pivot connecting the two strips together near their lower ends, so that the measuring strip may swing in a vertical plane about the pivot while the straight edge engages said mold wall inner face;

said measuring strip and said wall contact strip having a first position with each of said straight edges engaging said mold wall inner face;

an actuator means mounted at the upper ends of the two strips for moving the upper end of the measuring strip relative to the upper end of the wall contact strip so that the measuring strip swings about the pivot away from the mold wall inner face into vertical alignment relative to the mold contact strip;

a taper indicator mounted upon the strips between their upper and lower ends for measuring the distance of relative movement of the strips upon operation of said actuator means;

whereby said mold contact strip is arranged with a mold with its straight edge arranged in contact with the mold wall, and said actuator means is operated to move the measuring strip so that its straight edge swings away from the mold wall until its vertical position indicator gage indicates that it is in vertical position, at which time, the taper indicator means is used to determine the taper angle of the straight edge and therefore the wall face, relative to the vertical.

2. A taper gage as set forth in claim 1, and the length of said strips being approximately the same as the height of the mold wall.

3. A taper gage as set forth in claim 1, and a cross-bar secured to the upper end of the measuring bar for spanning between and resting upon two spaced apart walls of the mold while the contact strip engages the wall which extends between said spaced apart walls.

4. A taper gage as defined in claim 1, and including a second wall contact strip arranged parallel to and spaced from and being substantially identical to the first mentioned wall contact strip and being rigidly secured thereto, and with the measuring strip being located between the two wall contact strips, so that it swings in a direction away from the pair of parallel straight edges formed by the two wall contact strips.

5. A taper gage as defined in claim 1, and said actuating means being in the form of a manually adjustable screw interconnecting the strips at their upper ends so that turning the screw causes the strip to relatively move.

6. A taper gage as defined in claim 5, and including a spring means arranged between the strips near the upper ends thereof for normally spring biasing the strips together and for resisting the operation of the actuating means.

7. A taper gage as defined in claim 1, and said vertical position indicator gage comprising a manually readable level secured to the upper end of the measuring strip so that the position of the measuring strip may be optically determined simultaneously to holding the measuring strip against the mold wall and operating the actuator.

8. A taper gage as defined in claim 7, and said taper indicator means being in the form of a manually optically readable gage which is calibrated to show the taper of the mold wall in response to sensing the distance moved by the measuring strip into vertical alignment when the wall contact strip straight edge is engaged with the mold wall.

9. A taper gage as defined in claim 8, and including a second wall contact strip arranged parallel to and spaced from and being substantially identical to said first mentioned wall contact strip, and being rigidly secured thereto, and with the measuring strip being located between the two wall contact strips, so that it swings in a direction away from the pair of parallel straight edges formed by the two wall contact strips.

10. A taper gage as defined in claim 9, and including a handle on at least one of the wall contact strips for manually holding the taper gage with the straight edges in contact with the mold wall;

and said actuator means being in the form of a manually operable screw which interconnects the measuring strip and the wall contact strips and which moves the measuring strip, when manually turned, so that an operator may manually hold the gage in position against the mold wall with one hand, while manipulating the actuator with his other hand while he reads the level to determine when the measuring strip is vertical, at which point, he optically reads the taper indicator to obtain a direct reading of wall taper.

* * * * *